United States Patent [19]
Ross et al.

[11] Patent Number: 5,526,515
[45] Date of Patent: Jun. 11, 1996

[54] HARDWARE-DRIVEN CLOCK WITH OBJECT-ORIENTED INTERFACE

[75] Inventors: Patrick D. Ross, Sunnyvale; Matthew L. Denman, Los Gatos; Steve H. Milne, Palo Alto, all of Calif.

[73] Assignee: Taligent, Inc., Cupertino, Calif.

[21] Appl. No.: 269,282

[22] Filed: Jun. 30, 1994

[51] Int. Cl.⁶ .................................................. G05F 1/14
[52] U.S. Cl. ...................... 395/550; 364/270; 364/270.2; 364/270.3; 364/DIG. 1
[58] Field of Search ............................ 395/550; 364/270, 364/270.2, 270.3

[56] References Cited

U.S. PATENT DOCUMENTS

| | | | |
|---|---|---|---|
| 4,432,051 | 2/1984 | Bogaert et al. | 395/550 |
| 5,452,435 | 9/1995 | Malouf et al. | 395/500 |

OTHER PUBLICATIONS

Computer Logic: The Functional Design of Digital Computers, Ivan Flores, Prentice–Hall, Inc., 1960 pp. 196–205 and 95–97.

*Primary Examiner*—Kevin A. Kriess
*Assistant Examiner*—Dennis M. Butler

[57] ABSTRACT

Timing apparatus for use with a computer system works with clock hardware which periodically generates a tick update signal. The timing apparatus uses a floating point number to maintain a total tick count for representing absolute time so that both a large range and a high resolution can be accommodated. However, since floating point operations can not always be used at hardware, or interrupt, levels and there are some cases where a hardware-dependent time representation will produce performance gains, a hardware dependent clock system is also provided. The clock system is provided with a flexible interface by using object-oriented programming techniques and providing three clock objects that provide for three different clock representations. Each of the objects provides its own methods for converting between the time representation that it uses and the time representations used by the other objects.

25 Claims, 9 Drawing Sheets

HARDWARE-DRIVEN CLOCK WITH OBJECT-ORIENTED INTERFACE

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office, but otherwise reserves all copyright rights whatsoever.

1. Field of the Invention

This invention generally relates to improvements in computer systems and, more particularly, to real-time clocks for use in computer systems.

2. Background of the Invention

Modern computer systems utilize internal timer mechanisms or clocks for a variety of tasks. For example, a timer may be used for basic date and time calculations to "stamp" files with a date and time. The stamping operation is performed by storing a representation (either coded or uncoded) of the current date and time in the file. The date and time stamping allows various versions of the files to be compared so that the most recent version of the file can be determined. Such an arrangement is particularly useful in certain environments such as program development environments where files are continually being re-compiled and it is necessary to distinguish the most recent file version. Other obvious uses of such a clock include calendars and scheduling systems.

Although the idea of time stamps is relatively straightforward, there are various uses of time stamps which require the time information in different formats. Illustratively, there are file systems and networks that require time stamps to be monotonically increasing and valid relative to Greenwich Mean Time. The range of time stamps also varies considerably - systems that use time stamps vary between systems that use time stamps on video frames and sound traces to systems which must time stamp human history and geological events.

The dates and times provided by a timer service are conceptually different from a calendar service, which encompasses services such as managing calendar and date interpretations. Issues concerning clock bases, such as local time zones and standard time vs. daylight saving time, relate to a calendar service rather than to a timer service and, accordingly, will not be discussed herein.

Alternatively, timers may be used for setting "alarms" for user notification and the timing of intervals. There are two basic models which are used to generate alarms. These models include a UNIX" timer model based on "delay" in which an alarm is set to occur at a specific interval of time after the timer is set. The other model is an "alarm clock" timer model, where an alarm is set to occur at a specific clock time.

If a UNIX timer model is used by an application program that wants alarms to occur at exact, periodic intervals, the programmer must adjust the delay between alarms to take into account the amount of processing time used to set up the first alarm before the next alarm can be set up. A failure to adjust this delay causes the interval between the alarms to gradually drift away from the desired interval. However, this adjustment is difficult, if not impossible, since the adjustment must account for not only the time taken to execute the instructions setting up the alarm, but also must account for memory delays, cache behavior, preemption, etc.

With an alarm clock timer model, alarm timing is based on an internal clock and alarms are triggered at a specific absolute-time reading of the clock. The time interval from the triggering of one alarm to the triggering of the next alarm can be set precisely no matter how much processing time must be consumed to set up the first alarm before the next alarm can be set up. Therefore, there is no drift with an alarm clock model.

In order to accommodate these various needs, most computer systems incorporate a hardware clock circuit which operates independently of the main computer system. Generally, this clock circuit is powered by a battery so that it continues to run even if the computer system is powered down. The clock circuit continuously generates time information which can be utilized by the file system and other computer systems for the purposes described above.

Many clock circuits are based on the notion of "absolute" time. In an absolute time system, time increases monotonically from an origin of time or zero time (time=0). According to this model, all points in time after the origin are defined as an offset from the origin where the offset is measured in equal intervals or time units called "ticks". Because this absolute time model can work with any predefined time interval for each tick, the model is hardware independent, but some systems use tick times that are hardware dependent. For example, the Macintosh Battery Clock" used in the Macintosh Computer" developed and sold by the Apple Computer Corporation, Cupertino, Calif., measures time in ticks of one second starting at the year 1904. UNIX" measures time from 1970 using a tick time interval, which is undefined but usually around 10 msec. Once absolute time is defined for a particular system, other time representations, such as clock time and dates can be calculated from absolute time.

One of the most important considerations with an absolute time clock is the choice of the time interval contained within each time unit or tick. The time interval which is represented by each tick determines the clock resolution or the smallest quantity of time that can be represented. In order to increase the clock resolution the time interval can be shortened.

However, when the tick time interval is shortened to increase the clock resolution and the clock is used in a system which has a maximum integer size, the clock range decreases. In particular, range is the span or total amount of time that can be represented by the clock output. In an absolute time system, the clock output is the integer tick count. For any maximum integer value (as represented by 16, 32 or 64 bits), as the resolution increases, the maximum time range that can be represented decreases. The opposite also holds true, as the range of time to be represented with an integer value increases and the maximum integer size is fixed, each tick interval must represent a larger unit of time.

The resolution and range often depend heavily on the application and environment in which the timer is being used. For example, a resolution of one year might be acceptable for geologists in order get the range they need, however, such a resolution would be generally be unacceptable to historians who would need a resolution of at least a day. On the other end of the range, a one second resolution is barely useful for computer applications which typically require a resolution of a millisecond, or less, for real time operations. Consequently it is difficult to select a tick time interval which will accommodate these diverse needs without compromising the ability of the timer to adequately represent each possible application. Consequently, it is often necessary to create a different structure or type for each different range and resolution choice (for example, seconds, ticks, etc.)

Further, in order to be useful to the systems which use the time information, the simple absolute time information must often be formatted in a specific manner. For example, the absolute time may be formatted as date and time information. However, as more and more software must deal with time, the number of different representations of time becomes an important issue. Therefore it is important that a hardware clock have both a flexible internal representation and an interface mechanism which allows it to work with as many applications as possible using a small number of time representations.

Accordingly, it is an object of the present invention to provide a clock and timer system which can be used in environments which require a high resolution and also in environments which require a large range.

It is a further object of the present invention to provide a clock and timer system which has a flexible interface that can easily be adapted to suit the needs of various application programs without generating a multitude of time representations.

SUMMARY OF THE INVENTION

The foregoing problems are solved and the foregoing objects are achieved in one illustrative embodiment of the invention in which a floating point number is used for the total tick count to represent absolute time so that both a large range and a high resolution can be accommodated. However, since floating point operations can not always be used at hardware, or interrupt, levels and there are some cases where a hardware-dependent time representation will produce performance gains, a hardware dependent clock system is also provided.

The clock system is provided with a flexible interface by using object-oriented programming techniques and providing three clock objects that provide for three different clock representations. Each of the objects provides its own methods for converting between the time representation that it uses and the time representations used by the other objects.

DETAILED DESCRIPTION OF THE ILLUSTRATIVE EMBODIMENT

Figure 1:
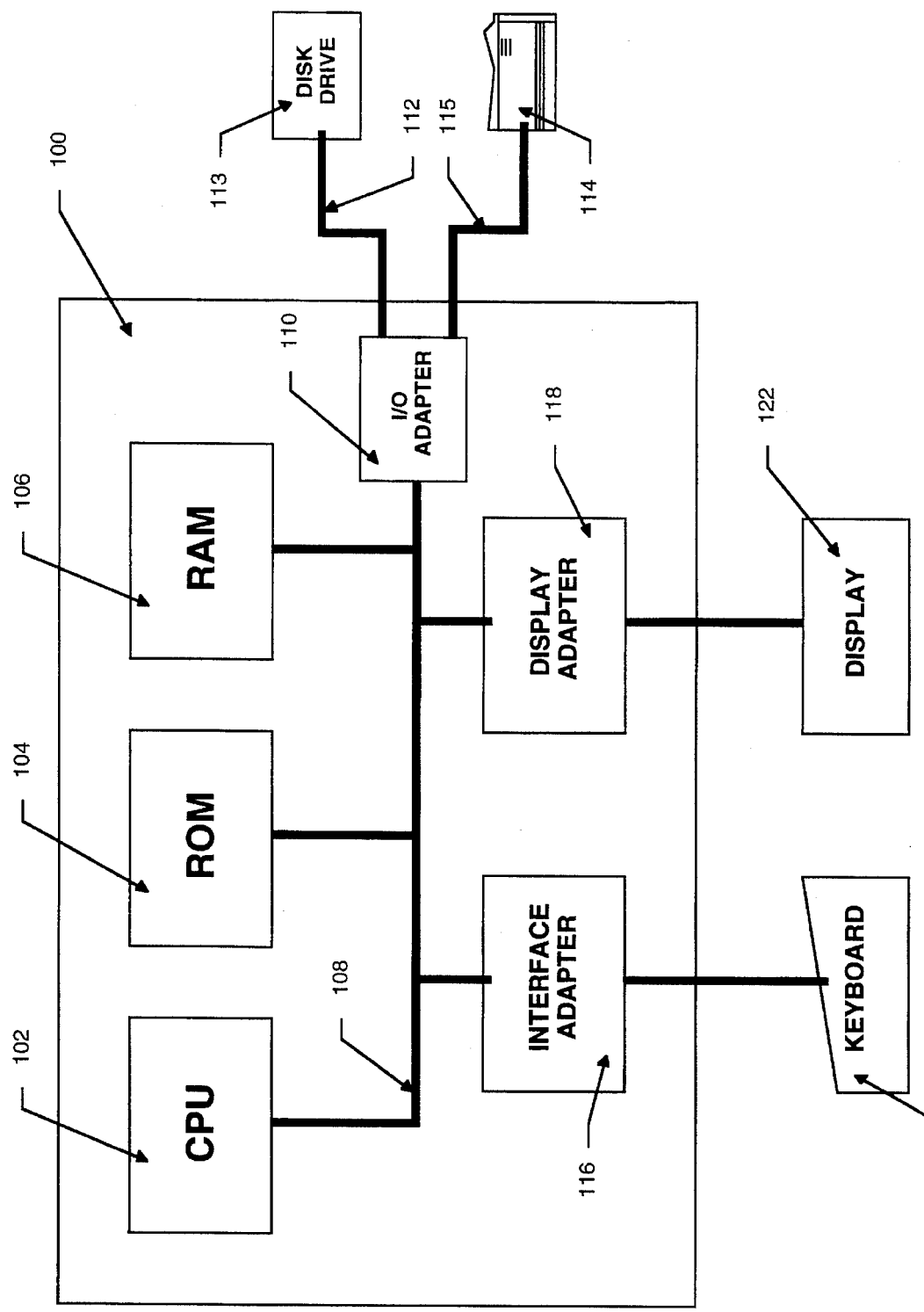
FIG. 1 is a block schematic diagram of a computer system, for example, a personal computer system on which the inventive object-oriented clock system operates.

In accordance with the principles of the invention, in one embodiment of the invention, a floating point number is used for the total tick count in an absolute time representation. Such a representation allows both a high resolution and a large range with the limitation that the range and resolution are inversely dependent. Specifically, the larger the range, the lower the resolution and the smaller the range the higher the resolution that can be represented. For instance, using a floating point number to represent the total tick count, a range of 2,056,438,328,186,013 years could be represented with a resolution of hours. Alternatively, a range of 208 days could be represented with a resolution of nanoseconds.

The following Table I represents some illustrative range and resolution values and shows the interdependence of the two values

TABLE I

| Resolution Units | Range | | | | |
|---|---|---|---|---|---|
| | Years | Days | Hours | Mi-nutes | Sec-onds |
| hours | 2,056,438,186,013 | 338 | 0 | 0 | 0 |
| minutes | 34,273,969,766 | 328 | 1 | 20 | 0 |
| seconds | 571,232,829 | 163 | 15 | 13 | 20 |
| 30 Hz video frames | 19,041,094 | 114 | 22 | 54 | 26 |
| 44.1 Khz sound samples | 12,953 | 45 | 18 | 21 | 59 |
| microseconds | 571 | 84 | 23 | 35 | 9 |
| 100 nanoseconds | 57 | 44 | 23 | 57 | 30 |
| 10 nanoseconds | 5 | 259 | 23 | 59 | 45 |
| nanoseconds | 0 | 208 | 11 | 59 | 58 |
| 100 picoseconds | 0 | 20 | 20 | 23 | 59 |
| 1 picosecond | 0 | 0 | 5 | 23 | 59 |

Range and Resolution for Floating Point Representation

With a double floating point number used for the total tick count, the resolution would be one picosecond or better for over five hours, and would have a resolution of a microsecond or better for over 571 years. Additional range and resolution extension could be obtained by using a long double floating point number. These ranges and resolutions are in contrast to the range and resolution which are possible where the absolute count is represented by integer values. These are illustrated in Table II as follows:

TABLE II

Range and Resolution for Integers

| Resolution | Range |
|---|---|
| Using an unsigned 32-bit integer | |
| 1 picosecond | 4.29 milliseconds |
| 1 millisecond | 49.71 days |
| 1 second | 136 years |
| Using an unsigned 64-bit integer | |
| 1 picosecond | 213.5 days |
| 1 millisecond | 584.9 years |
| 1 second | 584,941 years |

The ranges and resolutions obtainable with floating point numbers compare well to the 64 bit implementation for the higher resolutions, but the maximum range obtainable with floating point numbers extends far beyond 2,000,000,000,000 years.

Any unit of time can be used as the unit of measure. Since this method of representing time satisfies both the long range and fine resolution issue of representing time it can be used as the main time unit in a system. Consequently, for most applications, only one time class is necessary, and can be hardware independent. Further, two times can be combined to represent precise instances at long ranges. For instance, one time could be used as an offset of 2,000,000,000,000 years and the other time could then be used to represent time from that point with great accuracy.

Although floating point representation has the advantages outlined above, floating point operations cannot always be used at hardware, or interrupt, levels. In many cases, it is also desirable to use a hardware dependent representation of time for performance reasons. In accordance with the principles of the invention, a flexible, object-oriented interface is provided which has clock objects that embody two time models. More specifically, at least one clock object is provided which is a hardware-independent application interface representation of time. A second clock object is provided which is a integral hardware dependent representation of time used to measure time at the hardware, or interrupt level. The time representation for this second object is chosen for best performance and representation on each hardware platform.

The invention is preferably practiced in the context of an operating system resident on a personal computer such as the IBM, PS/2, or Apple, Macintosh, computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. In particular such a system framework is used for the clock system of the present invention. The clock objects provide their own internal time representation plus a set of predefined methods for converting the internal time representation into other representations. Consequently, an application software developer who needs clock and timer capabilities only needs to supply the characteristics and behavior of the timers, while the framework provides the actual routines which set up the timers and generate the alarms.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 2:
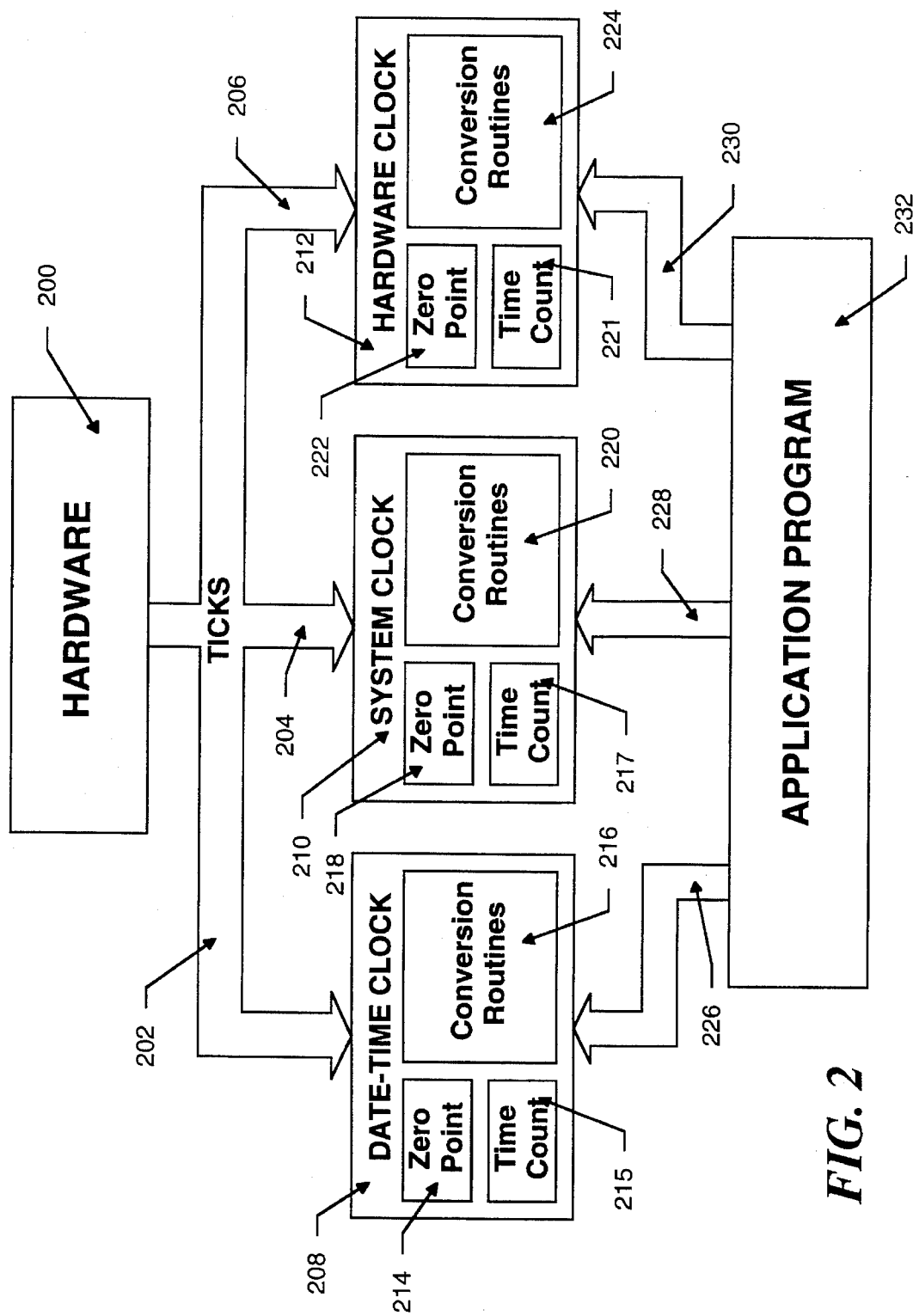
FIG. 2 is a block schematic diagram of an illustrative application program and its interaction with the timer hardware by means of clock objects.

FIG. 2 is a schematic block diagram which illustrates the interaction of an application program (illustrated as block 232) with three different clock objects indicated as date-time clock object 208 (the object is called TDateTimeClock), system clock object 210 (TSystemClock) and hardware object 212 (THardwareClock), which interaction is indicated schematically by arrows 226, 228 and 230, respectively.

Each of the clock objects, 208–212, polls the clock hardware 200 as required and receives the current time as indicated schematically by arrows 202, 204 and 206. The construction operation of the hardware clock circuitry 200 is well known and will not be described herein in detail. In particular, the circuitry generates tick signals at periodic intervals, which tick signals are applied to objects 208, 210 and 212.

Each of the objects 208, 210 and 212, in turn, uses the tick information to update an absolute time count starting from a zero point which is stored in the object. Each of the three objects 208, 210 and 212 has its own zero point for example, object 208 has a zero point 214. The zero point from which the time count starts can be chosen anywhere, but in accordance with a preferred implementation, the zero point for object 208 is chosen to be Mar. 1st, 2000 AD.. This time has been it is reasonably close to the present time and thus affords maximum resolution at the present time and it is a convenient date from which to make calendar calculations. Each of the three objects also maintains an internal time count, 215, 217 and 211, respectively.

When the above zero point is used with the floating point representation, the result is a one nanosecond resolution close to the year 2000; a ten nanosecond resolution or better from 1995–2005; ten microsecond resolution from around 500 BC.–4500 AD.; one millisecond resolution stretching over 1,000,000 years away from the zero point and one second accuracy for 1,000,000,000 years away from the zero point.

The TSystemClock object 210 also has a zero point 218. In contrast to the TDateTimeClock object, the TSystemClock object has a zero point at the time that the local system was booted. Similarly, the THardwareClock object 212 has a zero point which begins from the time that the clock was started. Generally, this clock is always powered up and running even when the associated computer system is not, so that its zero point is fixed and its internal count 221 or absolute time is always increasing.

Each clock object also has a set of internal methods which implement conversion routines which are used to convert the absolute time maintained within the object to the time representation which the object presents to the application program 232. For example, date/time clock object 208 has conversion routines 216. Similarly, system clock object 210 has its own conversion routines 220 that it uses to provide different time representations to application program 232. In a like fashion, hardware clock 212 has conversion routines schematically indicated as box 224 to provide application program 232 and objects 208 and 210 with absolute time information and with a representation of real time as discussed in detail below.

Clock objects such as TDateTimeClock 208 and TSystemClock 210, the manner of constructing the clock objects, and their use are described further in a co-pending U.S. patent application entitled "Multimedia Synchronization System" filed on May 10, 1993 and assigned to Taligent, Inc, the assignee of the present invention. The disclosure of the latter patent application is hereby incorporated by reference. Consequently, clock objects 208 and 210 will not be discussed in detail in the discussion below which focuses on the THardwareClock object 212 and the method of converting between S hardware dependent ticks and the hardware independent interface provided by clock object 212.

Figure 3:
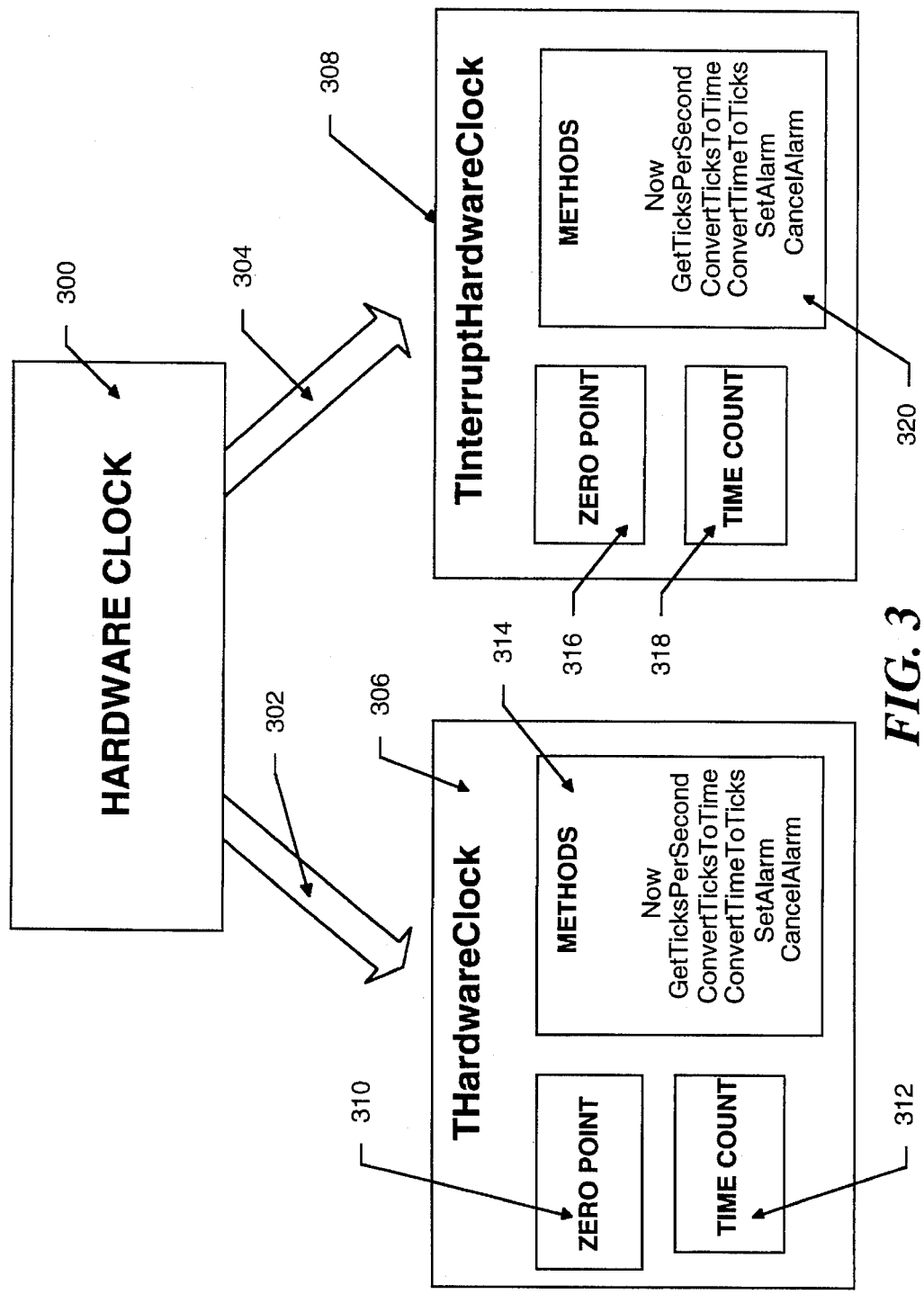
FIG. 3 is a more detailed block schematic diagram of a THardwareClock object illustrating the two component objects for user task and interrupt.

Although the hardware clock is shown as a single object in FIG. 2, there are actually two separate classes (and, thus, two separate objects which can be instantiated from the classes) as shown in FIG. 3. Object 300 shown in FIG. 3 is actually two objects 306 and 308 (illustrated schematically by arrows 302 and 304). The first class and associated object 306 is THardwareClock which is used as an interface for user tasks and is a hardware independent interface which uses the time representation as an input. This object 306 includes a zero point number 310 and time count 312 as previously described and methods 314 for obtaining the current number of ticks, setting and canceling alarms, determining the number of ticks per second and converting between ticks and more common time units used in the other clocks. The SetAlarm and GetAlarm functions are described in more detail in the aforementioned patent application entitled "Multimedia Synchronization System" referenced above and, accordingly, will not be discussed further herein. In accordance with the principles of the invention, as will hereinafter be described in detail, floating point routines are used in order to attain the resolution/range benefits described above.

The second clock object 308, TInterruptHardwareClock, provides a hardware-dependent interface to hardware timing services in the interrupt environment. This object includes a zero point 316, a time count 318 and methods 320 similar to those provided by the THardwareClock object 306 including methods for obtaining the current number of ticks, setting and canceling alarms, determining the number of ticks per second and converting between ticks and more common time units used in the other clocks. The TInterruptHardwareClock object 308 differs from the THardwareClock object 306 in that no floating point routines are used in the former object. As previously mentioned, such floating point routines may not be available in the interrupt environment.

In the THardwareClock and TInterruptHardwareClock objects, 306 and 308, there are four methods provided that allow for converting between real time (represented by a TTime class) and the hardware ticks (represented by a TSystemTicks class). These methods are specific to a hardware configuration and are added to the THardwareClock and TInterruptHardwareClock clock interfaces for the hardware they are representing. Two different methods called GetTicksPerSecond are available. The first method uses floating point operations and is used in-the THardwareClock object. The second GetTicksPerSecond method uses only integer operations and is used in the TInterruptHardwareClock object. The remaining two methods used in both the THardwareClock and TInterruptHardwareClock objects are ConvertTicksToTime and ConvertTimeToTicks.

Figure 4:
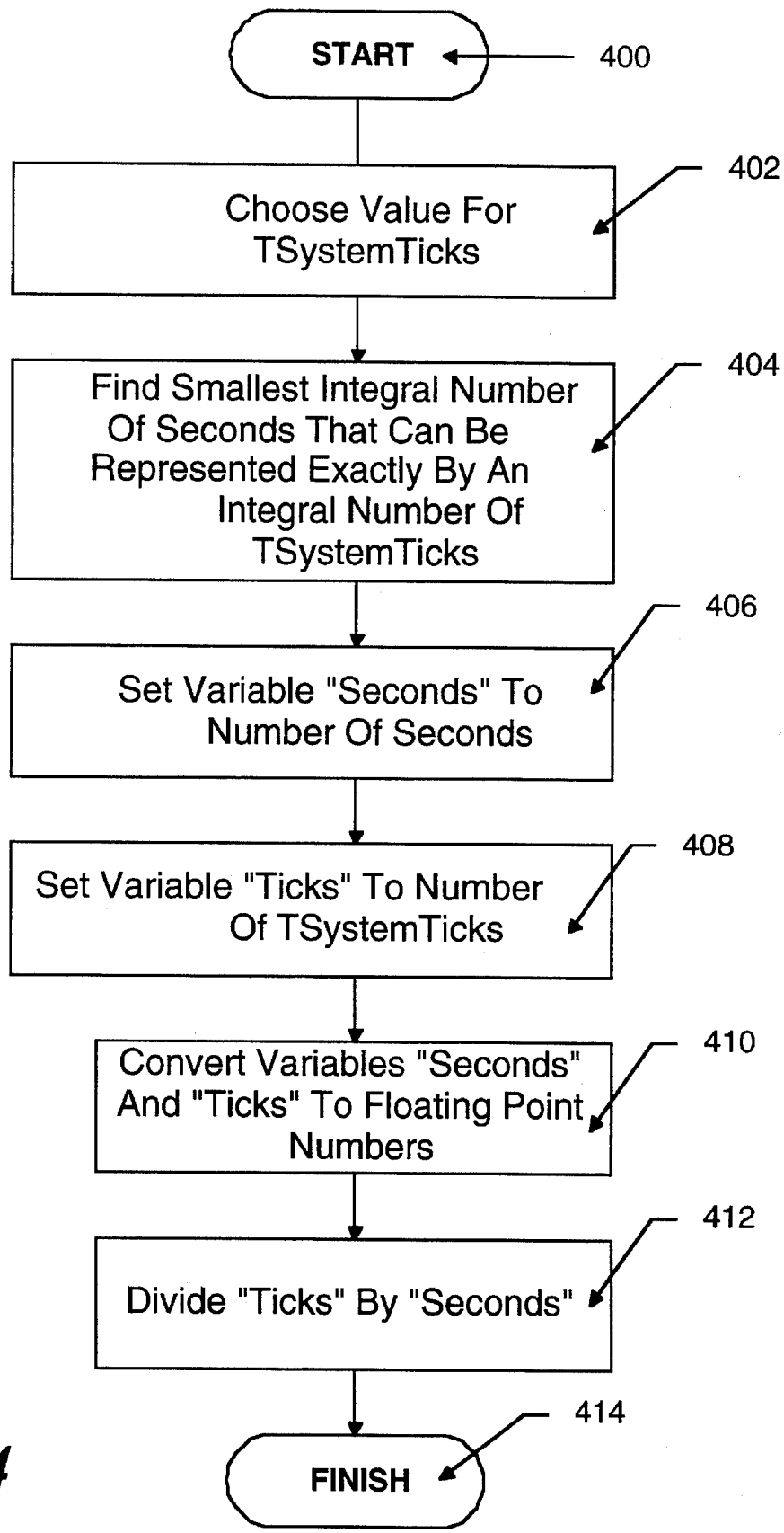
FIG. 4 is an illustrative flowchart of a method for generating a conversion value for converting between hardware "ticks" to time ("seconds") utilizing floating point number operations.

The first GetTicksPerSecond method returns a floating point number that represents the number of ticks per one second. This number can be used to divide an absolute time count in ticks to get the equivalent number of seconds (which can be passed to a constructor for a real time object) or it can be used to multiply a number of seconds to get the equivalent number of ticks. The steps involved in the method are shown in FIG. 4.

In particular, the routine starts in step 400 and proceeds to step 402 where a value is chosen for the object, TSystemTicks. In a "real time" clock system, the value for TSystemTicks would be chosen to represent the actual time interval between ticks generated by the hardware (hardware 200 in FIG. 2), however, in a non-real time system any value can be chosen for the time interval between tick updates.

Next, in step 404, using a conventional "modulo" routine the smallest integral number of seconds that represented exactly by an integral number of TSystemTicks tick intervals is determined. In step 406, a variable "Seconds" is set to the number of seconds determined in step 404 and, in step 408, a variable "Ticks" is set to the number of TSystemTicks determined in step 404.

Next, in step 410, both the "Seconds" variable and the "Ticks" variable are converted to floating point numbers using conventional floating point routines. Then, in step 412, the "Ticks" variable is divided by the "Seconds" variable to generate the conversion value stored in the object, GetTicksPerSecond, and the routine ends in step 414.

Figure 5:
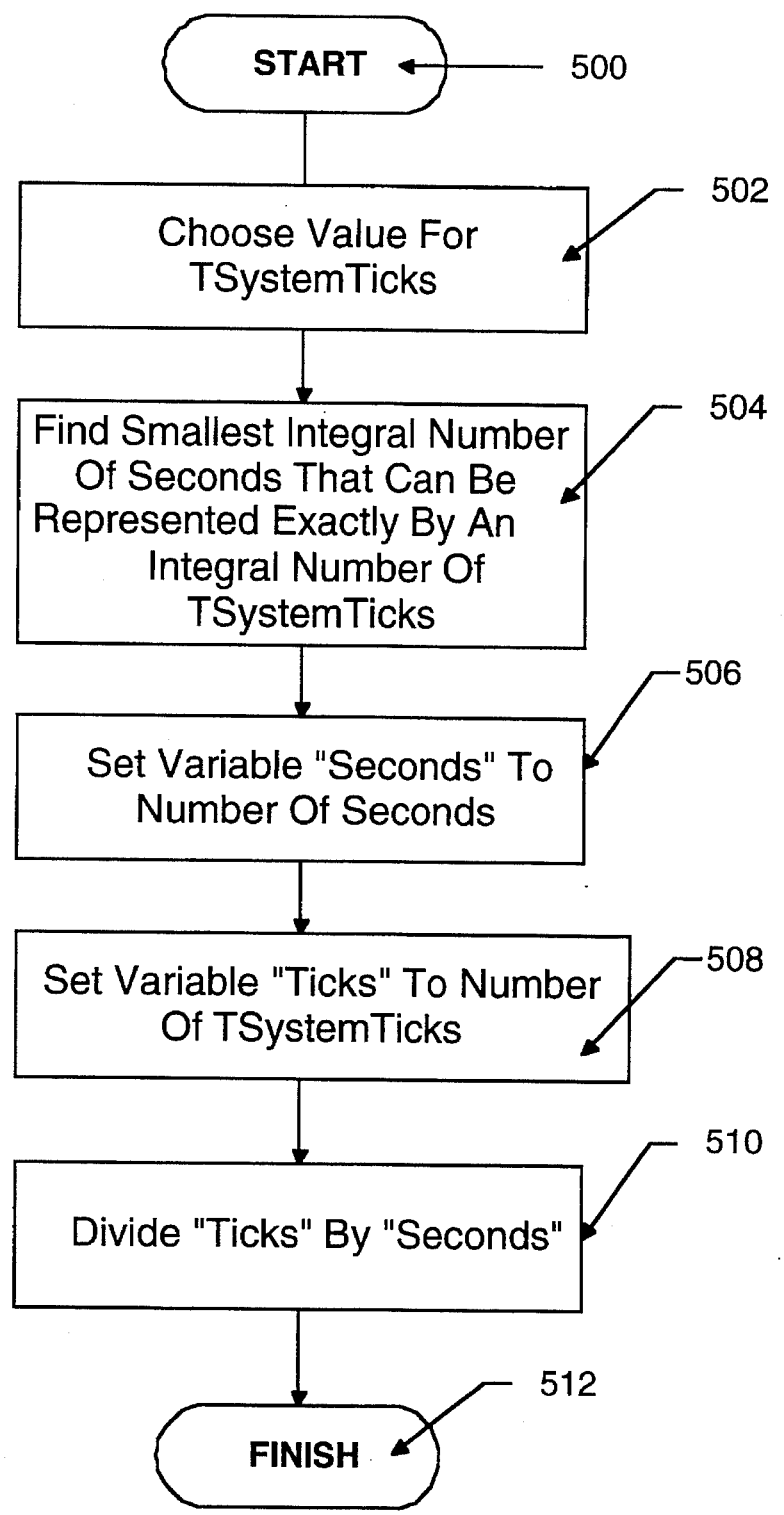
FIG. 5 is an illustrative flowchart of a method for generating a conversion value for converting between hardware "ticks" to time ("seconds") utilizing integer number operations.

The second GetTicksPerSecond routine also returns an integer number that represents the number of ticks per one second. This method is essentially equivalent to that shown in FIG. 4 and is shown in FIG. 5. The routine starts in step 500 and proceeds through steps 502–508. These steps are equivalent to steps with the similar numbers shown in FIG. 4 and previously discussed. For example, step 502 is equivalent to step 402, etc. However, after step 508 has been completed and the values of the "Seconds" and "Ticks" variables have been determined, the routine proceeds directly to step 510 in which the value of the "Ticks" variable is divided by the value of the "Seconds" variable using integer routines. The routine then finishes in step 512.

The method ConvertTicksToTime accepts an input in "Ticks", converts that input to a time representation and sets the variable "Time" the converted value. The routine starts in step 600 and proceeds to step 602 where the input "Ticks" is divided by the GetTicksPerSecond number returned from one of the GetTicksPerSecond routines illustrated in FIGS. 4 and 5. In the case of the THardwareClock object the routine illustrated in FIG. 4 is used to obtain the GetTicksPerSecond number, whereas, in the TInterruptHardwareClock object, the routine shown in FIG. 5 is used to obtain the GetTicksPerSecond number. The conversion routine then ends in step 604.

Figure 7:
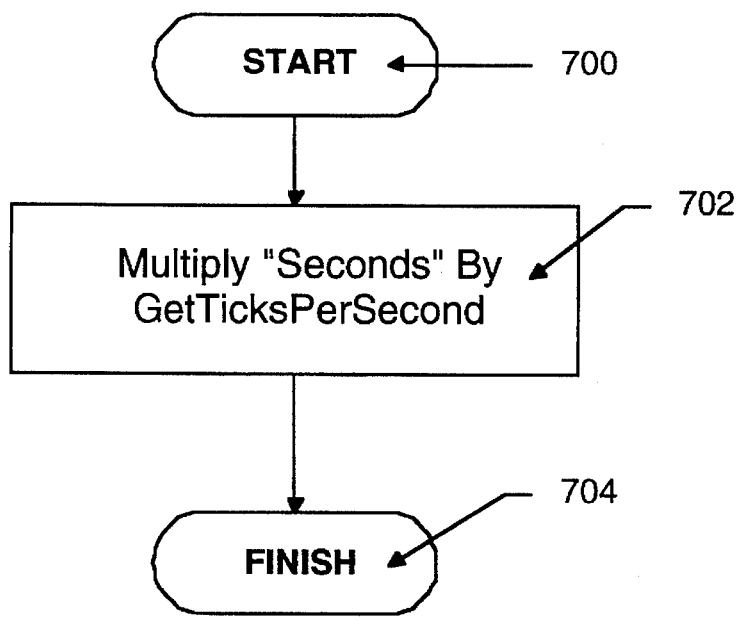
FIG. 7 is an illustrative flowchart of a method by a time (seconds) value is converted to a hardware "ticks" value using the conversion value determined in the routine illustrated in FIG. 5.

FIG. 7 shows the steps in the routine used to convert a time value (in seconds) to "Ticks". The routine starts in step 702 where the time value is multiplied by the conversion variable contained in the GetTicksPerSecond object and returned by one of the routines shown in FIGS. 4 and 5. Again, this conversion variable may be a floating point number or an integer depending on the object which is converting the time value. After the conversion is performed, the routine ends in step 704.

Figure 8:
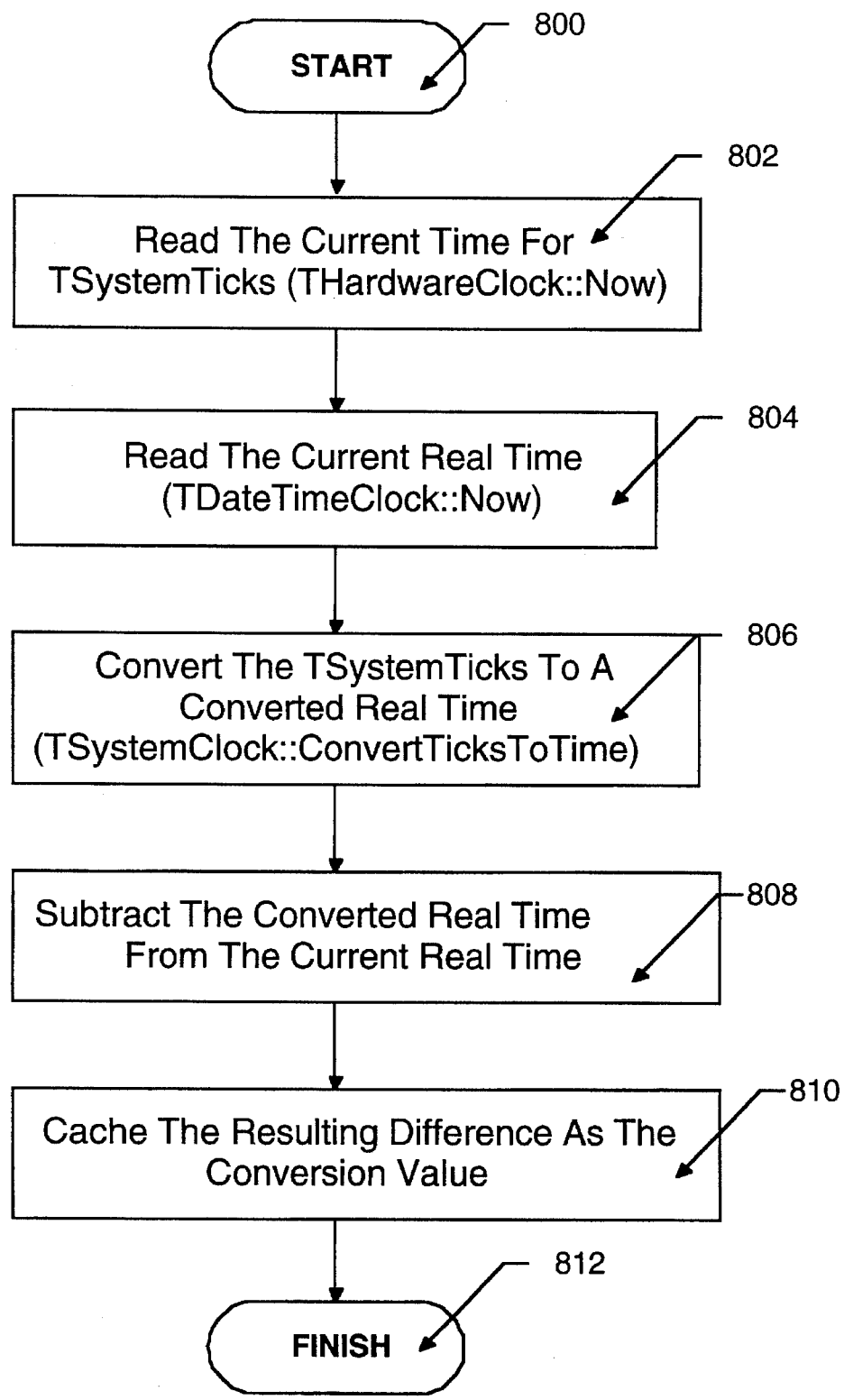
FIG. 8 is an illustrative flowchart of a method for generating a conversion value for converting between "ticks" to a real time.

FIG. 8 shows an alternative routine for converting the value of TSystemTicks to a real time value such as a date and time. This routine might be performed in any of the clock objects shown in FIG. 2 such as the TSystemClock object 210. This latter conversion routine begins in step 800 and proceeds to step 802 where a value of TSystemTicks is obtained by using the get method "Now" of the THardwareClock object methods 314 or the get method "Now" of the TInterruptHardwareClock methods 320.

Figure 6:
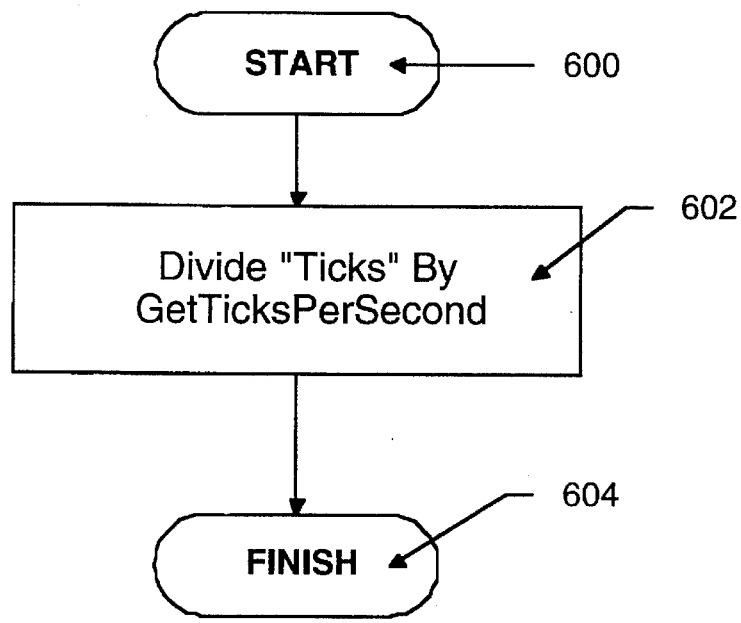
FIG. 6 is an illustrative flowchart of a method by which a hardware "ticks" value is converted to a time (seconds) value using the conversion value determined in the routine illustrated in FIG. 5.

In step 804 a "real time" value is obtained; the real time value represents a real time calculated from an appropriate zero point in one of the clock objects. Illustratively, the real time value is obtained by invoking the get method "Now" in the date-time clock object 208 (FIG. 2). From the tick and real time values, a conversion offset value can be calculated that can be added to the TSystemTicks object to represent a real time instant. This conversion value is calculated starting in step 806 where the ticks value in the TSystemTicks object is converted to a real time value using the ConvertTicksToTime method discussed in connection with FIG. 6 (operating in the TSystemClock object 210).

In step 808, the converted real time value determined in step 806 is subtracted from the current real time read from the date-time clock object in step 804 to determine the difference or conversion offset. In step 810, this difference is stored in a temporary cache memory location for use as a conversion value and the routine ends in step 812.

Figure 9:
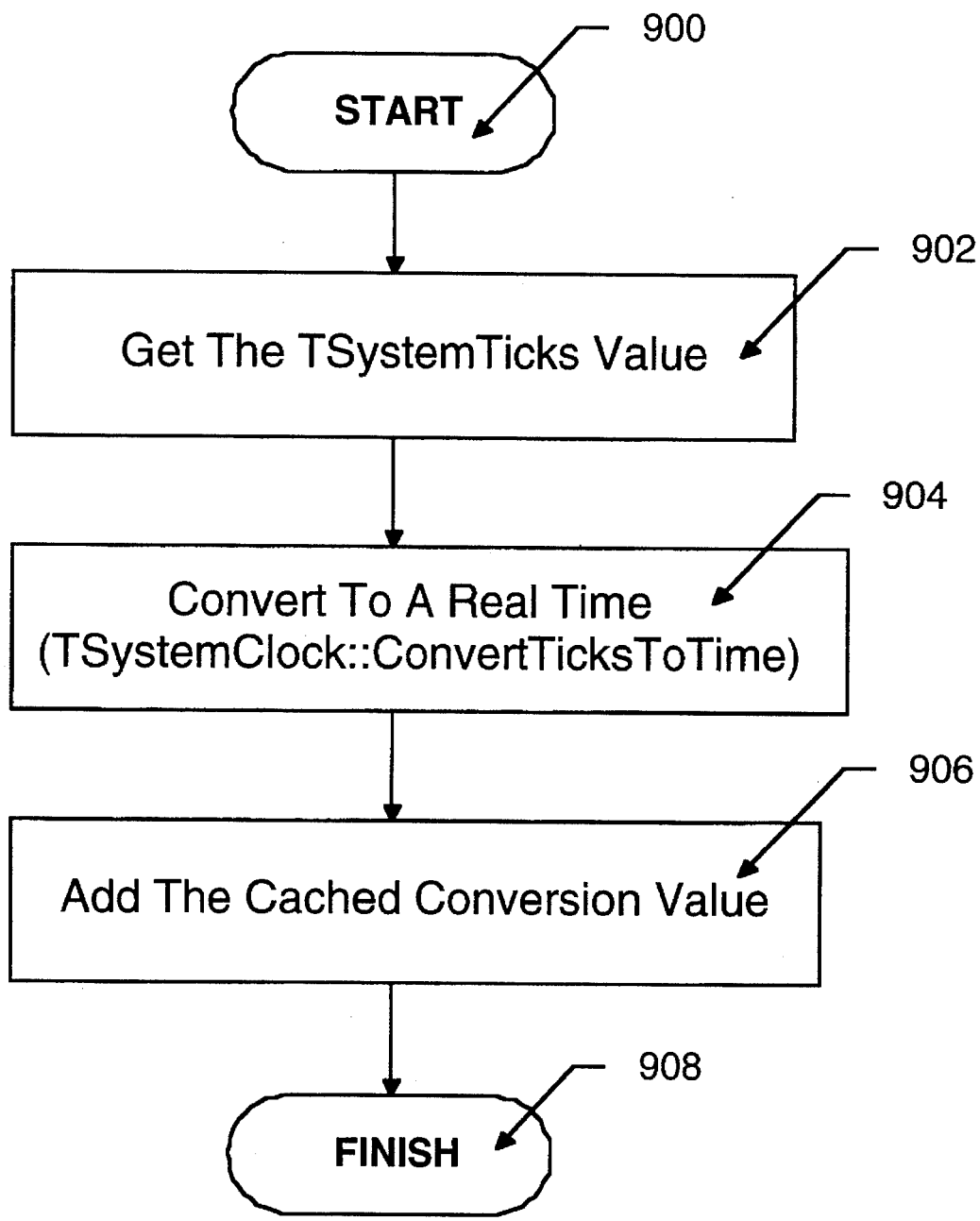
FIG. 9 is an illustrative flowchart of a method by which a hardware "ticks" value is converted to a real time value using the conversion value determined in the routine illustrated in FIG. 8.

The conversion value determined in the routine illustrated in FIG. 8 can be used in another simple routine which converts TSystemTicks values to a real time value and an illustrative routine which performs this operation is shown in FIG. 9. In particular, the routine starts in step 900 and proceeds to step 902 where a TSystemTicks value to be converted is obtained from the THardwareClock object 212. The TSystemTicks value is converted to a real time value using the ConvertTicksToTime routine shown in FIG. 6. Next, in step 906, the cached conversion value calculated by the routine shown in FIG. 8 is added to the converted real time value to the correct the time offset and the routine finishes in step 908.

Figure 10:
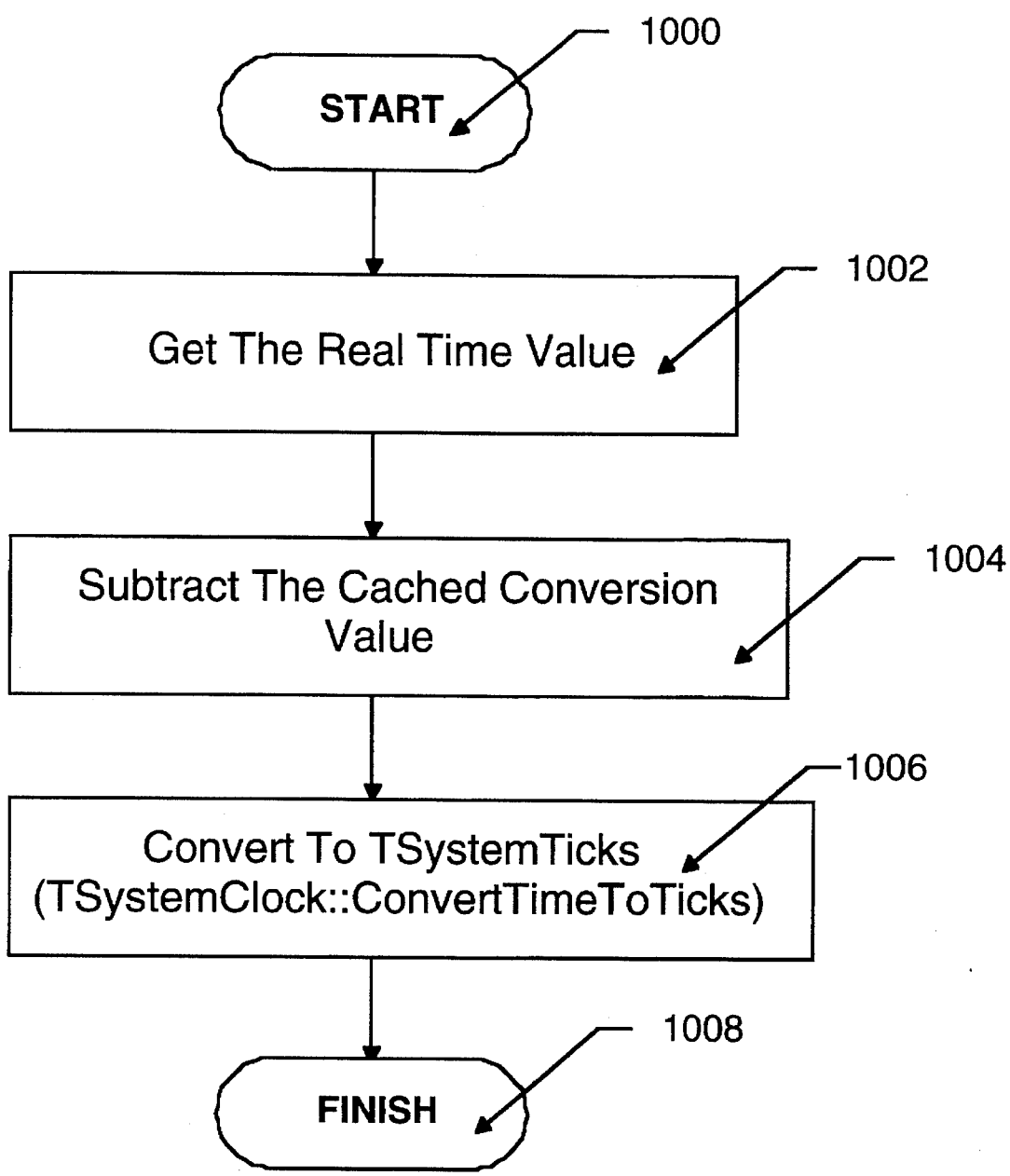
FIG. 10 is an illustrative flowchart of a method by a real time value is converted to a hardware "ticks" value using the conversion value determined in the routine illustrated in FIG. 8.

Alternatively, to convert a real time value to the TSystemTicks representation, a routine such as that shown in FIG. 10 can be used. In particular, the routine starts in step 1000 and proceeds to step 1002 where the real time value is obtained (for example, from either the date- time clock object 208 or the system clock object 210). Next, the cached conversion value (calculated as shown in FIG. 8) is subtracted from the converted real time value in step 1004. Finally, in step 1006, the converted value is converted to a TSystemTicks value using the ConvertTimeToTicks routine shown in FIG. 7. The routine then finishes in step 1008.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. An apparatus for a computer system to generate an absolute time signal with a varying resolution, comprising:
    (a) circuitry for periodically generating a tick update signal; and
    (b) an apparatus for the representation of an absolute time signal with a varying resolution, comprising:
        (1) storage apparatus for storing a zero point number representing the zero point time; and
        (2) a time count apparatus for storing an absolute time signal represented as an absolute floating point number based on a predetermined number of tick update signals; and
    (c) an update apparatus responsive to each tick update signal for recalculating the absolute floating point number to indicate a number of tick update signals received by the time count apparatus since the zero point time.

2. Timing apparatus according to claim 1, wherein the update apparatus comprises apparatus responsive to each tick update signal for incrementing the absolute floating point number.

3. Timing apparatus according to claim 1, wherein the update apparatus comprises apparatus responsive to each tick update signal for decrementing the absolute floating point number.

4. Timing apparatus according to claim 1, wherein the time count apparatus comprises apparatus responsive to the absolute floating point number for converting the absolute floating point number into a converted real time representation having a predetermined format.

5. Timing apparatus according to claim 4, further comprising apparatus for maintaining a current real time representation having the predetermined format and wherein the time count apparatus further comprises apparatus responsive to the current real time representation for comparing the current real time representation with the converted real time representation to determine a conversion offset value.

6. Timing apparatus according to claim 5, wherein the time count apparatus further comprises apparatus responsive to a real time representation in the predetermined format for converting the real time representation into a real time floating point number.

7. Timing apparatus according to claim 6, wherein the apparatus for converting the real time representation into a real time floating point number comprises apparatus for retrieving the conversion offset value; apparatus responsive to the retrieved conversion offset value for subtracting the retrieved offset value from the real time representation to generate a corrected real time value and apparatus responsive to the corrected real time value for converting the corrected real time value to a 8. An apparatus for an object-oriented computer system to generate an absolute time signal with a varying resolution, comprising:

(a) circuitry for periodically generating a tick update signal;

(b) storage apparatus;

(c) a first real time clock object representing an absolute time signal with a varying resolution, comprising:

(1) data including a zero point number stored in the storage apparatus which zero point number represents a zero point time; and (2) an absolute floating point number stored in the storage apparatus representing the absolute time signal based on a predetermined number of tick update signals; and (d) a first method responsive to each tick update signal for recalculating the absolute floating point number to indicate a number of tick update signals received by the time count apparatus since the zero point time.

9. Timing apparatus according to claim 8, wherein the first real time clock object comprises a second method responsive to each tick update signal for incrementing the absolute floating point number.

10. Timing apparatus according to claim 8, wherein the first real time clock object comprises a third method responsive to each tick update signal for decrementing the absolute floating point number.

11. Timing apparatus according to claim 8, wherein the first real time clock object further comprises a fourth method responsive to the absolute floating point number for converting the absolute floating point number into a converted real time representation having a predetermined format.

12. Timing apparatus according to claim 11, including a second real time clock object for maintaining a current real time representation having the predetermined format and wherein the first real time clock object further comprises a fifth method responsive to the current real time representation for comparing the current real time representation with the converted real time representation to determine a conversion offset value.

13. Timing apparatus according to claim 12, wherein the first real time clock object further comprises a sixth method responsive to a real time representation in the predetermined format for converting the real time representation into a real time floating point number.

14. Timing apparatus according to claim 13, wherein the sixth method comprises a seventh method for retrieving the conversion offset value; an eighth method responsive to the retrieved conversion offset value for subtracting the retrieved offset value from the real time representation to generate a corrected real time value and a ninth method responsive to the corrected real time value for converting the corrected real time value to a real time floating point number.

15. Timing apparatus according to claim 8, further comprising a hardware clock object comprising data including a zero point number stored in the storage apparatus which zero point number represents a zero point time and an absolute integer number stored in the storage apparatus which absolute integer number represents the absolute time signal; and a tenth method responsive to each tick update signal for recalculating the absolute integer number to indicate a number of tick update signals received by the time count apparatus since the zero point time.

16. Timing apparatus according to claim 15, wherein the hardware clock object comprises an eleventh method responsive to each tick update signal for incrementing the absolute integer number.

17. Timing apparatus according to claim 15, wherein the hardware clock object comprises a twelfth method responsive to each tick update signal for decrementing the absolute integer number.

18. Timing apparatus according to claim 15, wherein the hardware clock object comprises a thirteenth method responsive to the absolute integer number for converting the absolute integer number into a converted real time representation having a predetermined format.

19. A method for generating an absolute time signal with a varying resolution in a computer system, the method comprising the steps of:

(a) periodically generating a tick update signal;

(b) storing a zero point number which represents a zero point time;

(c) storing an absolute floating point number as the absolute time signal which absolute time signal has a varying resolution based on a predetermined number of tick update signals; and (d) recalculating the absolute floating point number in response to each tick update signal so that the absolute floating point number represents the number of tick update signals generated since the zero point time.

20. A method according to claim 19, wherein step (d) includes the step of incrementing the absolute floating point in response to each tick update signal.

21. A method according to claim 19, wherein step (d) comprises the step of decrementing the absolute floating point number in response to each tick update signal.

22. A method according to claim 19, further comprising the step of converting the absolute floating point number into a converted real time representation having a predetermined format.

23. A method according to claim 22, including the step of comparing the current real time representation with the converted real time representation to determine a conversion offset value.

24. A method according to claim 23, further comprising the step of converting the converted real time representation into a real time floating point number.

25. A method according to claim 24, including the steps of:

(a) retrieving the conversion offset value;

(b) subtracting the retrieved conversion offset value from the real time representation to generate a corrected real time value; and (c) converting the corrected real time value to a real time floating point number.

* * * * *